Figure 1:
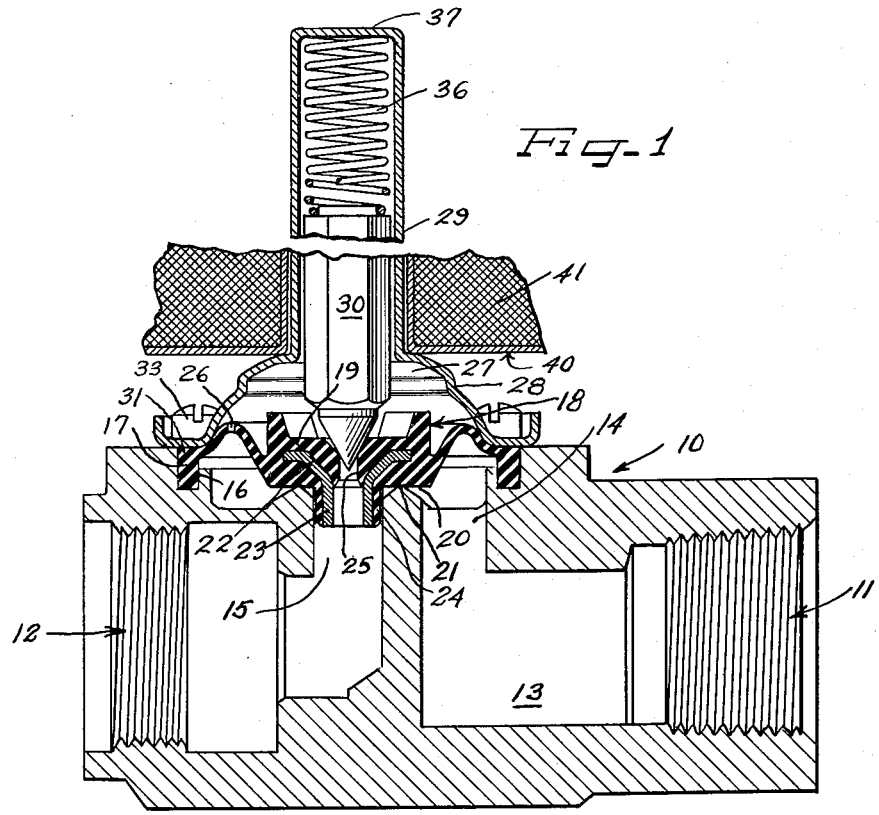

July 25, 1961 R. R. DAHL 2,993,676
DIAPHRAGM SHUT OFF VALVE
Filed April 29, 1958

Inventor
Robert R. Dahl

United States Patent Office 2,993,676
Patented July 25, 1961

2,993,676
DIAPHRAGM SHUT OFF VALVE
Robert R. Dahl, Lincolnwood, Ill., assignor to The Dole Valve Company, Morton Grove, Ill., a corporation of Illinois
Filed Apr. 29, 1958, Ser. No. 731,833
1 Claim. (Cl. 251—38)

This invention relates to improvements in pressure operated diaphragm valves and more particularly relates to an improved form of pressure operated diaphragm valve in which both water hammer and non-closure of the valve due to the presence of small foreign particles are prevented.

The present invention is an improvement upon the invention disclosed in applicant's prior application, Serial No. 479,046, filed on December 31, 1954, now Patent No. 2,844,352 granted July 22, 1958, in which a member depending from a diaphragm valve cooperates with an outlet port to throttle the water as the valve is closing and thereby prevent too rapid closing and water hammer.

It has been found that when the two cooperating throttling surfaces are rigid, foreign particles which may become trapped therebetween will prevent the valve from closing. Prior to the present invention, however, it has not been feasible to make one of the cooperating throttling members of resilient material, because then swelling of the resilient member due to prolonged exposure to water would prevent the valve from closing while allowance of greater clearance to compensate for swelling would destroy the throttling effect. By the present invention there is provided means whereby the clearance between cooperating members is maintained small enough to provide effective throttling, resiliency is provided so that entrapment of foreign particles will not prevent valve closing, and swelling of resilient material due to water exposure is kept at a minimum so as not to significantly affect valve closing.

Since rubber is apt to swell somewhat when exposed to water for prolonged periods due to water absorptions, particularly when subjected to adverse temperature and/or pressure conditions, applicant provides a relatively thin walled depending rubber like boss supported by a nondeformable insert which rubber like portion will not swell appreciably. Such a diaphragm provides the desired advantageous fluid throttling effect to prevent water hammer and avoids possible non-closing of the valve due to the presence of foreign material or due to swelling of the depending boss.

While applicant hereafter discloses the preferable means of providing a resilient surface on one of the cooperating throttling members, it should be understood that the surface on the means depending from the diaphragm may be maintained rigid, and a stationary resilient surface may be provided instead by providing a resilient lining for the port, as by providing a rubber insert in place of the metal insert of the aforesaid prior application.

It is therefore a principal object of this invention to provide a slow closing diaphragm valve of the type above described cooperable with a fluid port which will close tightly irrespective of the presence of small foreign particles in the fluid flowing therepast.

A further and important object of this invention is to provide a pressure operated diaphragm valve and associated valve body wherein means depending from the diaphragm cooperates with an outlet port to throttle flow and effect slow closing, resiliency is provided to enable closing of the valve in spite of entrapped foreign particles, and swelling of resilient material due to water exposure will not affect valve closing ability.

Another object of this invention is to provide an integral hollow thin walled depending resilient boss formed integrally with a fluid operated diaphragm valve which boss is dimensioned to nearly fill the fluid port into which it is arranged to depend.

A still further object of the present invention is to provide a slow closing pressure operated diaphragm valve in which the harmful effects of water hammer are eliminated in a simple and expeditious manner and in which leakage or non-closing of the valve can be prevented regardless of the presence of entrapped foreign particles between the side walls of the port and the diaphragm itself.

Figure 2:
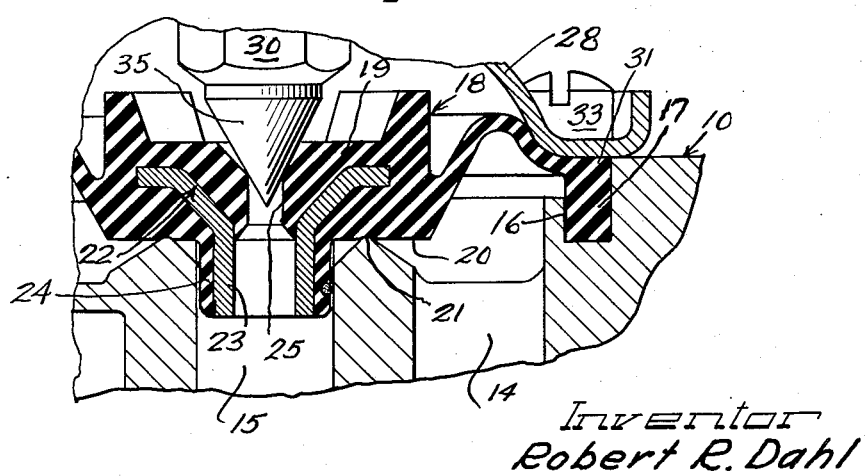

These and other objects of the invention will appear from time to time as the following specification proceeds and with reference to the accompanying drawing wherein:

FIGURE 1 is a vertical sectional view through a pressure operated solenoid controlled diaphragm valve constructed in accordance with the present invention mounted in a shut off valve body; and FIGURE 2 is an enlarged fragmentary sectional view of the device illustrated in FIGURE 1 and showing the presence of an entrapped particle between the side wall of the port and the depending resilient boss of the diaphragm valve.

In the embodiment of the invention illustrated in FIGURE 1, there is shown a valve body 10 having an inlet 11 and an outlet 12 each of which are suitably threaded to be connected to supply and delivery hoses respectively. The inlet passage 13 forms an extension of the threaded inlet 11 and is communicable with an annular passage 14 which opens to one side of the valve body 10.

A port 15 communicable with the fluid outlet 12 is formed within the valve body 10 concentric with the annular passage 14 and opens to the same side thereof as the annular passage 14. An annular groove 16 circumscribes the annular passage 14 and is formed concentric therewith in the side of the valve body and is arranged to receive a depending annular lip 17 of a flexible annular diaphragm 18. The diaphragm valve 18 is preferably formed from rubber, an elastomer, or other like resilient material, and has a thickened central portion 19 the inner face 20 of which is engageable with an annular seat 21 defining the port 15 to block the flow of fluid through the port.

The thickened central portion 19 of the diaphragm valve 18 is shown as having a flanged metal insert 22 molded therein which depends below the annular inner face 20 of the diaphragm valve 18. The depending tubular portion 23 of the insert 22 is formed in registry with a central passageway 25 leading through the diaphragm valve 18.

It will be seen that the insert 22 is arranged to form a support for a relatively thin walled depending tubular boss 24 which is formed integrally with the diaphragm valve 18. As will be observed in FIGURE 1, the depending tubular boss 24 has a relatively close fit with the inner wall of the port 15 when the valve is moving to a closed position with respect thereto so as to provide a throttling action to the flow of water during valve closing movement to slow the closing of the valve to thus prevent water hammer.

The diaphragm valve 18 is also provided with a bleeder passageway 26 outwardly of the thickened portion 19 thereof which leads into a diaphragm chamber 27 formed between the upper lateral surface of the diaphragm valve 18 and the inside of an end closure cap 28, having a central integrally formed guide 29 extending therefrom and having an armature 30 guided therein. It will be understood by those skilled in the art that more than one bleeder passageway may be provided and that the number and size of bleeder passageways governs the speed of valve closing movement and reduces the chances of valve failure due to the entrapment of foreign particles in the bleed passageways.

The end closure cap 28 is shown as abutting the outer peripheral portion 31 of the diaphragm valve 18 and as being retained thereto as by machine screws 33 extending through the cap 28 and threaded within the side of the valve body 10.

The armature 30 has an integrally formed conical valve 35 at its lower end portion, engageable with the wall portion of the diaphragm valve 18 defining the passageway 25 leading through the central thickened portion 19 of the diaphragm valve 18, by a spring 36 seated at one end against the outer end of the armature 30 and at its opposite end in an end wall 37 of the guide 29 of the end cap 28.

The armature 30 forms the armature of a solenoid 40, the coil 41 of which encircles the guide member 29 and is not herein shown or described in detail since it forms no part of the present invention.

Upon energization of the coil 41 the conical valve 35 on the end of the armature 30 will move out of engagement with the wall portion of the diaphragm valve 18 defining the passageway 25 and fluid within the diaphragm chamber 27 will be directed to the outlet 12 through the central passageway 25. Since the total area of the bleeder passageways 26 is substantially less than the area of the central passageway 25 fluid will be exhausted from the diaphragm chamber 27 in this manner faster than fluid will flow into the chamber through the bleeder passageways 26 and a fluid pressure differential will be created across the diaphragm valve 18 so that the pressure of fluid within the annular passage 14 will act to move the diaphragm out of engagement with the annular seat 21 to directly intercommunicate the passageways 14 and 15.

Upon deenergization of the solenoid 40, the spring 36 will move the armature 30 into the closed position with respect to the central fluid passageway 25 leading through the diaphragm valve 18. Fluid will then flow through the bleeder passageways 26 until the fluid pressure acting on each side of the diaphragm 18 has become equalized so that the force of spring 36 acting on the armature 30 will move the diaphragm valve 18 into engagement with the seat 21.

Referring now more particularly to FIGURE 2 in the drawings, it will be seen that an entrapped foreign particle between the inner walls of the port 15 and the diaphragm valve 18 is embedded or impacted in the thin walled tubular boss 24. It will be seen that deformation of the boss 24 enables complete valve closure so that no leakage is created therepast. When the diaphragm valve 18 moves to the open position with respect to the port 15 the fluid turbulence about the depending tubular boss will generally disengage the particle from its impacted position within the thin walled boss 24 of the valve 18 and will flush the particle through the outlet 12.

In practice it may further be desirable to provide strainers in the inlets to the valve body to filter out relatively large particles of foreign material which could not be compensated for by applicant's novel device. In ordinary usage, however, it will generally not be necessary to provide such strainers.

Applicant has discovered that it is possible to provide an adequate wall thickness for depending tubular boss 24 such that the wall is thick enough to provide sufficient resiliency to enable valve closing with entrapped foreign particles of a size small enough to pass through the inlet strainer, and yet the wall is thin enough so that the swelling of the resilient material upon prolonged exposure to water is not sufficient to cause interference between the throttling surfaces.

It will herein be further understood that this embodiment of the invention has been used for illustrative purposes only and that various modifications and variations of the present invention may be affected without departing from the noval spirit and scope of the concepts thereof.

I claim as my invention:

In a fluid control valve having an inlet and an outlet and a port communicating said inlet with said outlet, a fluid actuated diaphragm valve cooperable with said port to control fluid flow therethrough, a central flow passageway extending through said diaphragm, a thin walled resilient tubular boss formed in registry with said central fluid passageway depending from said diaphragm for close fitting coaction with the inner wall of said port upon valve closing movement, the thickness of said boss being predetermined so that it is sufficient to yield to grit in the fluid but is not sufficient that swelling of the boss will cause binding with the seat, and an annular insert molded within said diaphragm and formed concentrically with said central fluid passageway and abutting so as to support the entire inner wall of said tubular boss.

References Cited in the file of this patent

UNITED STATES PATENTS

| 1,317,563 | Eckenroth | Sept. 30, 1919 |
| 1,595,786 | Johnson | Aug. 10, 1926 |
| 2,620,133 | Obermaier | Dec. 2, 1952 |
| 2,712,324 | Lund | July 5, 1955 |
| 2,792,016 | Shellman | May 14, 1957 |
| 2,815,923 | Clark | Dec. 10, 1957 |
| 2,826,367 | Cobb | Mar. 11, 1958 |
| 2,844,352 | Dahl | July 22, 1958 |